United States Patent [19]

Frantz et al.

[11] 4,218,908
[45] Aug. 26, 1980

[54] DEVICE AND METHOD FOR SHORTENING REACTOR PROCESS TUBES

[75] Inventors: Charles E. Frantz; William K. Alexander; Walter E. B. Lander, all of Richland, Wash.

[73] Assignee: The United States of America as represented by the United States Department of Energy, Washington, D.C.

[21] Appl. No.: 5,947

[22] Filed: Jan. 24, 1979

[51] Int. Cl.³ .................... B21D 3/10; G21C 21/00
[52] U.S. Cl. ............................. 72/302; 72/367; 176/38
[58] Field of Search ............... 72/302, 301, 367, 377, 72/342; 29/157.4; 176/37, 38

[56] References Cited

U.S. PATENT DOCUMENTS

| | | | |
|---|---|---|---|
| 3,467,042 | 9/1969 | Coppa | 72/367 X |
| 3,793,873 | 2/1974 | Iwata et al. | 72/367 |

*Primary Examiner*—Milton S. Mehr
*Attorney, Agent, or Firm*—Richard G. Besha; Frank H. Jackson; Jerold B. Schnayer

[57] ABSTRACT

This disclosure describes a device and method for in situ shortening of nuclear reactor zirconium alloy process tubes which have grown as a result of radiation exposure. An upsetting technique is utilized which involves inductively heating a short band of a process tube with simultaneous application of an axial load sufficient to cause upsetting with an attendant decrease in length of the process tube.

15 Claims, 2 Drawing Figures

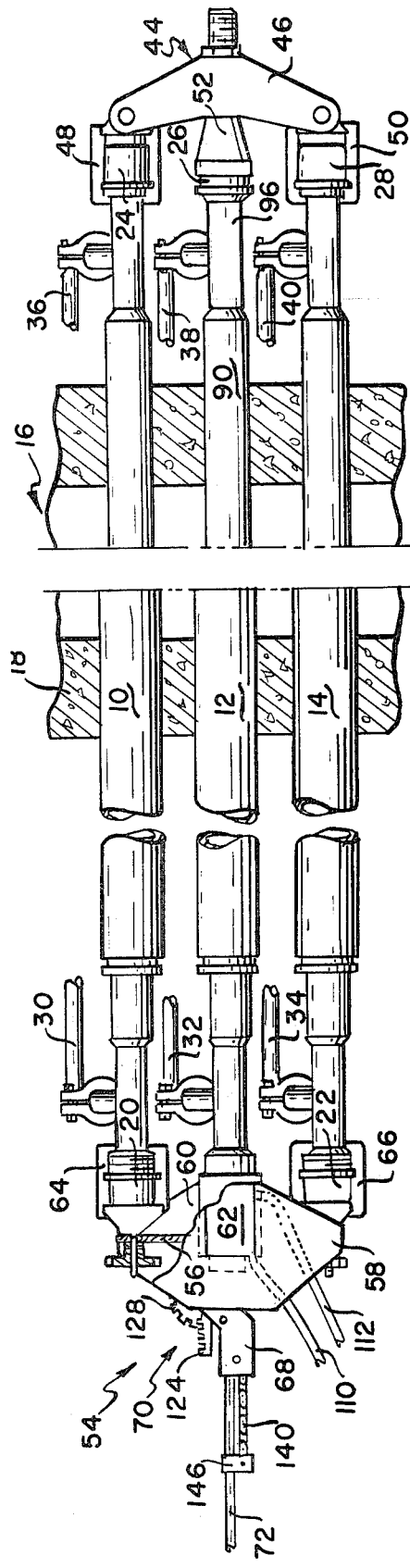

DEVICE AND METHOD FOR SHORTENING REACTOR PROCESS TUBES

CONTRACTUAL ORIGIN OF THE INVENTION

The invention described herein was made in the course of, or under, a contract with the U.S. DEPARTMENT OF ENERGY.

BACKGROUND OF THE INVENTION

This invention relates to a device and method for in situ shortening of nuclear reactor zirconium alloy process tubes which have grown as a result of radiation exposure. More particularly, the invention concerns an in situ upsetting technique which involves inductively heating a short band of a process tube with simultaneous application of an axial load sufficient to cause upsetting with an attendant decrease in length of the process tube.

One particular reactor which has zirconium alloy process tubes which have grown as a result of radiation exposure is the N Reactor located at the Richland Operations Hanford Plant of The Department of Energy, Richland, Washington. N Reactor is primarily a large cube of stacked graphite bars penetrated horizontally by 1003 zirconium alloy process tubes and surrounded by a thick shield of very dense concrete to contain the radiation of the nuclear process. Uranium fuel assemblies are placed in the process tubes and high-pressure cooling water is pumped through these tubes to pick up the heat which is released from the uranium during the fission process. It has been discovered that the process tubes have been growing in length as the result of the radiation exposure. This tube elongation produces severe undesirable effects such as connector interference or packing gland-key interference.

Connector interference is caused by unequal growth rate of adjacent process tubes. Each process tube has a carbon steel inlet nozzle secured to its inlet (front) side. Attached to each inlet nozzle is a high-pressure inlet coolant connector pipe. Since there is an average $\frac{7}{8}$ inch clearance between adjacent coolant pipes as the process tubes grow at unequal growth rates, the high-pressure coolant pipes are forced into contact with each other, thereby creating unwanted stress.

Packing gland-key interference is caused by the following. At the inlet end the process tube is attached to the inlet nozzle by means of a rolled joint. Surrounding the process tube and the attached portion of the inlet nozzle is a thimble. The end of the thimble is sealed against the inlet nozzle by a packing gland which is a dynamic gas seal designed to allow some movement of the process tube due to thermal expansion. Also four keys evenly space the inlet nozzle from the thimble and are provided for torsional rigidity. Since the tubes have grown unexpectedly as a result of radiation exposure, these keys come in contact with the packing gland. Further, since the thimble is rigidly secured to the reactor shield, the growth causes the shield to be pulled away from the reactor.

A possible method for correcting this unanticipated tube growth is to shorten the tube by an amount needed to correct the problem. The method must be safe, reasonably fast, and not compromise reactor integrity. It must also be capable of remedying either connector or packing gland-key interference.

It is therefore one object of the present invention to provide a device for in situ shortening a reactor process tube.

It is a further object of this invention to provide an in situ method for shortening a reactor process tube.

More particularly it is a further object of this invention to in situ shorten the process tube utilizing an upsetting technique which involves heating a short band of the process tube with simultaneous application of an axial load sufficient to cause upsetting with an attendant decrease in length of the process tube.

Finally it is an object of this invention to provide a device and method for shortening reactor process tubes which is safe, reasonably fast, and will not compromise reactor integrity.

SUMMARY OF THE INVENTION

In accordance with the invention, a device and method are disclosed for in situ shortening of reactor process tubes which have grown as a result of radiation exposure. An upsetting technique is utilized which involves heating a short band of the process tube with simultaneous application of an axial load sufficient to cause upsetting with an attendant decrease in length of the process tube.

The axial load is provided by a front jacking assembly which reacts against and puts a tensile load on the inlet ends of adjacent process tubes. Also a rear reaction jack which is secured to the outlet end of the process tube being shortened and the outlet end of the two adjacent process tubes is provided to distribute the compressive forces exerted on the process tube being shortened over three process tubes.

A gear mechanism is provided which automatically advances the heater within the process tube a predetermined amount proportional to the amount the process tube is shortened. The rate of motion of the heater is adjusted so that, as the process tube is upset and the outside diameter of the tube increased, the tube will only fill the annulus between the process tube and a tube sleeve within which it is enclosed. This prevents a reduction in the inside diameter of the process tube.

BRIEF DESCRIPTION OF THE DRAWINGS

Other objects and advantages of the invention will become apparent upon reading the following detailed description and upon reference to the drawings in which:

FIG. 1 is a view showing three vertically aligned process tubes for the N Reactor with the central portion thereof cut away and with the mechanism of the present invention attached to the ends thereof; and FIG. 2 is an enlarged vertical section of the inlet end of the process tube which is being shortened.

While the invention will be described in connection with a preferred embodiment, it will be understood that it is not intended to limit the invention to that embodiment. On the contrary, it is intended to cover all alternatives, modifications and equivalents as may be included within the spirit and scope of the invention as defined by the appended claims.

DETAILED DESCRIPTION OF THE INVENTION

Referring to FIG. 1, there is shown the end portions of three vertically adjacent process tube assemblies 10, 12 and 14 extending through a portion of reactor 16 and a portion of concrete shield 18 which surrounds reactor 16. The previously mentioned N Reactor will be used to illustrate a preferred embodiment of the invention. In all, there are a total of 1003 similar horizontal process tube assemblies which extend through reactor 16. Screwed to the inlet (front) end of the process tube assemblies 10 and 14 are inlet nozzle caps 20 and 22. Although process tube assembly 12 normally has an inlet nozzle cap, it has been removed to allow the apparatus for shortening process tube 12 to be installed. Screwed to the outlet (rear) ends of process tube assemblies 10, 12 and 14 are outlet nozzle caps 24, 26, and 28. These caps are provided to allow ready access to the process tube assemblies for maintenance, repair, and charging and discharging of fuel elements. For circulation of coolant inlet coolant connectors 30, 32, and 34 and outlet coolant connectors 36, 38, and 40 are connected at the inlet ends and outlet ends of process tube assemblies 10, 12, and 14. Each of the 1003 process tube assemblies also has similar inlet and outlet coolant connectors with an average clearance of $\frac{7}{8}''$ between adjacent pipes.

Attached about either end of process tubes 10, 12, and 14 is the apparatus for shortening reactor process tube 12. Rear reaction jack 44 has pivotally pinned to opposite ends of support 46 clamps 48 and 50. Clamps 48 and 50 wrap around outlet nozzle caps 24 and 28 to secure rear jacking assembly 44 to process tube assemblies 10 and 14. Outlet nozzle cap 26 is seated in cup 52 which is bolted to the center of support 46. Rear reaction jack 44 is provided to distribute the compressive forces exerted on process tube 12 over three process tubes.

Front jacking assembly 54 contains center support 56 which is perpendicular to the axis of process tube assembly 12. Side supports 58 and 60 are welded perpendicularly about either side of center support 56. Extending through and welded to the center of center support 56 and side supports 58 and 60 is hydraulic press 62. Bolted to the opposite ends of center support 56 are clamps 64 and 66 which wrap around inlet nozzle caps 20 and 22 to secure front jacking assembly 54 to process tube assemblies 10 and 14. The purpose of this is to anchor hydraulic press 62 against adjacent process tube assemblies 10 and 14 while hydraulic press 62 is horizontally loaded against process tube assembly 12 which is to be shortened.

Also perpendicularily bolted to center support 56 is gear support 68. Motion amplifying gears 70 are mounted in the center of U-shaped gear support 68. Motion amplifying gears 70 are secured to handle 72. This will be explained in more detail later.

Referring to FIG. 2, there is shown a cross section of the end portion of the inlet side of process tube assembly 12 which is similar in construction to the other process tube assemblies. This view is used to provide a more detailed description of the structure and operation of process tube assembly 12, motion amplifying gears 70 and hydraulic press 62.

Process tube assembly 12 contains the following elements. At the inlet end process tube 80 is attached to carbon steel inlet nozzle 82 by means of rolled joint 84 with portion 86 of inlet nozzle 82 extending past rolled joint 84 and overlapping the end of process tube 80. Surrounding process tube 12 with a uniformly dimensioned annulus therebetween is tube sleeve 88. The end of tube sleeve 88 is screwed to the end of portion 86 of inlet nozzle 82. Surrounding tube sleeve 88 is thimble 90 which extends over a portion of and is sealed at its end by packing gland 92 against the outer surface of portion 86 of inlet nozzle 82. Packing gland 92 is a dynamic gas seal designed to allow some movement due to thermal expansion of process tube 80. Thimble 90 is also secured to reactor shield 18 (not shown). Four keys 94 are provided (only 2 are visible) which are secured by screws in inlet nozzle 82 and seat against a slide in keyways (not shown) on the inside wall of thimble 90 to provide torsional rigidity between thimble 90 and inlet nozzle 82.

Although not visible, the outlet end of process tube 80 is attached by means of a rolled joint to an outlet nozzle 96 (visible in FIG. 1). Outlet nozzle 96 is secured against the reactor shield 18. Therefore, the outlet end, unlike the inlet end of process tube assembly 12, is not designed to allow for thermal expansion of process tube 80.

It is noted that when the N-Reactor was first built the process tube assemblies were designed to allow for thermal expansion of the process tubes toward the inlet side when the reactor heats up. However, as the process tubes have unexpectedly grown as a result of their exposure to radiation, the keys come in contact with the packing gland which exerts a force on the thimble. This phenomenon is called packing gland-key interference. Since the thimble is secured to the reactor shield, as the process tube expands, the reactor shield is pulled away from the reactor.

Mounted to the front end of inlet nozzle 82 is hydraulic press 62 which is part of front jacking assembly 54. Hydraulic press 62 comprises piston 98 having piston flange 100 which seals against the inside wall of annular cylinder 102. The end portions 104 of cylinder 102 seal against the outside body of piston 98, thereby forming two chambers 106 and 108. Penetrating cylinder 102 is a high-pressure water line 110 which forces high-pressure water into chamber 106 and a low-pressure air inlet line 112 which forces low-pressure air into chamber 108. The high-pressure water from high-pressure water line 110 forces piston 98 against the end of inlet nozzle 82. Low-pressure air from low-pressure air line 112 drives piston 98 away from inlet nozzle 82. The end of piston 98 has a cap 114 which fits over and is seated against the end of inlet nozzle 82. Piston 98 also has an axial channel 116 whose purpose will be described later.

Cylinder 102 is welded to center support 56 and side supports 58 and 60. Piston 98 has a threaded end portion 118 which has screwed upon it cap 120. Cap 120 has hole 122 to allow access to axial channel 116.

Motion amplifying gears 70 are attached to gear support 68 as follows. Rack 124 is attached to cap 120 whereby horizontal motion of piston 98 is transmitted to rack 124. Rack 124 engages pinion gear 126. Pinion gear 126 is coaxial with and attached for rotation with pinion driver gear 128. Both gear 126 and driver gear 128 are mounted upon and freely rotated about stud shaft 130 which is attached to and protrudes from gear support 68. Driver gear 128 engages pinion driven gear 132 which is coaxial with and attached for rotation with sprocket 134. Both sprocket 134 and driven gear 132 are mounted upon and rotate freely about stud shaft 136 which is attached to and protrudes from gear support 68. Wrapped around and engaged to the top teeth of sprocket 134 and the bottom teeth of a sprocket roller 138 is chain 142. Roller 138 is rotatively mounted upon stud shaft 140 which is attached to and protrudes from gear support 68. One end of chain 142 is secured to weight 144 and the other end to connector 146. Weight 144 is to keep chain 142 engaged with sprocket 134 and roller 138. Connector 146 is clamped to handle 72 which extends through hole 122 of cap 120, through axial channel 116 of piston 98 and into inlet nozzle 82 and process tube 80. Attached to the end of handle 72 is induction heating coil 148. Handle 72 supports and positions heating coil 148 within the center of process tube 80. Handle 72 is supported for axial movement within the center of process tube 80 by a tube sleeve (not shown) within which handle 72 is slidably engaged. The portion of the tube sleeve to which handle 72 is slidably engaged is located to the left of connector 146 in FIG. 1.

The apparatus for shortening process tube assembly 12 which is connected to, as described above, process tube assembly 12 and adjacent process tube assemblies 10 and 14 is operated as follows. To load process tube assembly 12 hydraulic press 62 is activated by pumping high-pressure water through high-pressure water line 110 and into chamber 106. The high-pressure water forces piston 98 down cylinder 102 which forces attached cap 114 against the end of inlet nozzle 82, thereby creating a constant axial pressure in inlet nozzle 82 and connecting process tube 80.

A portion of process tube 80 is heated by activating heating coil 148. When the temperature of the heated portion of process tube 80 approaches the upset temperature, process tube 80 begins to upset with an attendant decrease in length and increase in outer diameter of the heated portion of process tube 80.

As process tube 80 shortens, piston 98 is driven further down cylinder 102, thereby pulling rack 124 a distance equal to the amount process tube 80 has been shortened. Rack 124 engages the rest of motion amplifying gears 70 which are attached through handle 72 to heating coil 148. Motion amplifying gears 70 have an overall gear ratio of 16:1 which means that for every 1/16 inch that process tube 12 is shortened heating coil 148 is advanced one inch further into process tube 12. As process tube 80 starts to shorten, motion amplifying gears 70 move heating coil 148 further into process tube 80, thereby heating more of the tube and allowing additional shortening. The above outlined process of shortening process tube 80 is continued until the problems of connector interference and packing gland-key interference have been corrected. Process tube 80 is normally shortened between 1.0 and 1.25 inches so heating coil 148 is moved, and the shortening is done, over 16 to 20 inches of process tube 80.

As noted above, the disclosed method for in situ shortening of process tube 80 is to simultaneously apply appropriate levels of axial pressure and temperature to cause process tube 80 to upset. There are several things that should be noted about this method. Process tube 80 can be upset at an infinite combination of applied axial pressures and temperatures. The pushing force and temperature are inversely related; the more force exerted the lower the temperature at which the tube will upset. In fact, if enough force is applied, the tube will inevitably shorten at ambient temperature. The reason for using heat is to select the area in which the shortening is to take place. In practice the heat is applied no closer than 15 inches to rolled joint 84 and entirely outside of concrete shield 18. The length of this segment of process tube 80 which is outside of concrete shield 18 is about 54 inches.

The size of the portion of process tube 80 which is heated is purposely limited to insure uniform heating and thereby even expansion. In practice a band approximately 1 inch long is heated. Experiments show that for best results the length of tube which should be heated is between $\frac{1}{3}$ and $\frac{1}{2}$ the diameter of the process tube. Process tube 80 has an inside diameter of approximately 2.7 inches.

Fuel elements are inserted inside process tube 80 and must be slidable throughout its entire length. Therefore a reduction in the internal diameter at any place along the entire length of process tube 80 cannot be tolerated. It is noted that, as upsetting occurs and process tube 80 shortens, the outside diameter of the heated area of process tube 80 increases while the inside diameter remains constant. However, if outward expansion is physically restricted, then the tube will grow inward and the inside diameter of the tube will decrease. As noted before, there is a nominal 1/16 inch diametrical clearance between process tube 80 and tube sleeve 88 which surrounds it. Therefore the amount of upsetting over an axial segment of process tube 80 must be limited so that the upset segment of process tube 80 does not completely fill the annulus between process tube 80 and tube sleeve 88 and thereby cause the inner diameter of process tube 80 to decrease. To insure that this will not occur, motion amplifying gears 70 automatically advance heater coil 148 down process tube 80, in the case of N-Reactor 1 inch for every 1/16 inch that process tube 80 is shortened.

Process tube 80 is made of Zircaloy II. Zircaloy II is the trade name for an alloy of zirconium which contains 1.5% Sn, 0.15% Fe, 0.10% Cr, and 0.05% Ni. However, process tube 80 can be made from any alloy of zirconium. It has been established experimentally that 1450° F.+200° F. is the best range of temperatures to heat process tube 80, with 1450° F. being the optimum temperature. Published literature on Zircaloy II strength at elevated temperatures indicates that the yield strength at 1450° F. is about 5000 psi. Since the wall area of process tube 80 is 2.58 inches squared, this indicates that if it was subject to a longitudinal compressive load of (2.58×5000) about 13,000 lbs, and simultaneously heated to a uniform 1450° F., it should yield and expand into the annulus between process tube 80 and tube sleeve 88.

In practice, heating coil 148 is an inductive heater excited by a high-frequency generator, operated in the region of 300 kh frequency and 18 kw power; this power input rate will heat a one-inch wide band of process tube 80 to 1450° F. in about 30 seconds. An inductive heater is used because it can heat a limited portion of process tube 80 to the same temperature. As soon as the temperature of process tube 80 reaches about 1450° and is simultaneously subjected to sufficient longitudinal force, process tube 80 will upset, shortening it by about 1/16 inch per one-inch long band heated. Heater coil 148 is automatically driven one inch further into process tube 80 for each 1/16 inch process tube 80 is shortened. As soon as the proper temperature is reached, heater coil 148 advances smoothly and steadily down process tube 80.

As noted before, process tube 80 will upset if it is heated to a temperature of 1450° F. and an axial pressure of about 13,000 lbs is applied. However, if the section of process tube 80 is not uniformly heated, nonuniform upsetting and therefore possible inward expansion might occur. To prevent this, in practice 38,000+1000 lbs is axially applied to process tube 80. This is done so that, even if the heating is not truly uniform, process tube 80 will evenly expand. The reason for this is that as the hotter section expands, the cooler section sees higher unit stress and can expand at a much lower temperature than 1450° F.

Thus it is apparent that there has been provided in accordance with the invention a device and method for in situ shortening of reactor process tubes that fully satisfies the objects, aims, and advantages set forth above. While the invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

I claim:

1. A method for reducing the length of a nuclear reactor process tube in situ wherein the spaces surrounding the tube is restricted comprising:
   heating a portion of the tube from the interior, and simultaneously applying a limited longitudinal force to the tube effective to cause the heated portion of the tube to upset in an outward direction only with an attendant decrease in the length of the tube, said decrease in the length of the tube causing the portion of the tube being heated to change, thus permitting additional shortening without contact between the tube and the restriction surrounding the tube which might cause the tube to expand inwardly.

2. The method according to claim 1 wherein the portion of the tube to be heated is changed by axially advancing a heater within the tube upon application of a constant limited longitudinal force, and the application of heat and longitudinal force are continued as the heater is axially advanced to shorten the tube a substantial amount without contact between the tube and the restriction surrounding the tube which might cause the tube to expand inwardly.

3. The method according to claim 2 wherein said heated portion of the tube is heated to substantially the same temperature wherefore upsetting occurs uniformly throughout said heated portion of the tube.

4. The method according to claim 3 wherein the tube is made of a zirconium alloy and the heated portion of the tube is heated to substantially the same temperature of between 1250° F. and 1650° F.

5. The method according to claim 4 wherein the length of the heated portion of the tube is between ½ and ⅓ the diameter of the tube.

6. The method according to claim 2 wherein the longitudinal force is applied to the tube while restraining the tube at the opposite end thereof by securing the tube to adjacent tubes.

7. The method according to claim 2 wherein the longitudinal force applied is effectively greater than the yield strength of the metal from which the tube is fabricated at the temperature which the tube is heated wherefore upsetting occurs uniformly about the periphery of the tube.

8. The method according to claim 2 wherein the tube is made of a zirconium alloy and the longitudinal force which is applied is equivalent to a pressure of between 14,341 and 15,116 pounds per square inch.

9. The method according to claim 8 wherein the length of the heated portion of the tube is between ½ and ⅓ the diameter of the tube.

10. The method according to claim 9 wherein the heated portion of the tube is heated to substantially the same temperature of between 1250° F. and 1650° F.

11. The method according to claim 10 wherein the longitudinal force is applied to the tube while restraining the tube at the opposite end thereof by securing the tube to adjacent tubes.

12. A device for reducing the length of a nuclear reactor process tube in situ comprising:
   a heater,
   means for supporting the heater within the tube,
   a hydraulic press loaded against the tube for applying a longitudinal force to the tube effective to cause a heated portion of the tube to upset with an attendant decrease in the length of the heated portion of the tube, and
   means for restraining movement of the tube by securing the tube to adjacent tubes.

13. The device according to claim 12 wherein the restraining means comprises means for clamping the tube to the tubes immediately above and immediately below the tube to be shortened.

14. The device according to claim 12 and including motion amplifying gears coupling the heater to the hydraulic press to automatically move the heater within the process tube a predetermined amount proportional to the amount the tube is shortened.

15. The device according to claim 12 wherein the motion amplifying gears have approximately a 16 to 1 ratio wherefore each time the tube is shortened 1/16 inch the heater is moved approximately one inch further within the tube.

* * * * *